United States Patent [19]

Muro

[11] Patent Number: 5,499,526

[45] Date of Patent: Mar. 19, 1996

[54] SEMICONDUCTOR SENSOR SELF-CHECKING CIRCUIT

[75] Inventor: Hideo Muro, Kanagawa, Japan

[73] Assignee: Nissan Motor Co., Ltd., Yokohama, Japan

[21] Appl. No.: 369,284

[22] Filed: Jan. 6, 1995

Related U.S. Application Data

[63] Continuation of Ser. No. 959,622, Oct. 13, 1992, abandoned.

[30] Foreign Application Priority Data

Oct. 14, 1991 [JP] Japan ...................... 3-293685

[51] Int. Cl.⁶ ........................................ G01L 1/20
[52] U.S. Cl. ................................................ 73/1 D
[58] Field of Search ........................ 73/1 B, 1 C, 1 D, 73/4 R, 4 V

[56] References Cited

U.S. PATENT DOCUMENTS

| | | | |
|---|---|---|---|
| 4,155,263 | 5/1979 | Frantz | 73/771 |
| 4,572,309 | 2/1986 | Nishiyama | 73/1 B |

FOREIGN PATENT DOCUMENTS

| | | |
|---|---|---|
| 58-142205 | 8/1983 | Japan . |
| 59-3368 | 1/1984 | Japan . |
| 60-120225 | 6/1985 | Japan . |
| 61-164124 | 7/1986 | Japan . |

OTHER PUBLICATIONS

Mutoh et al. "*Toyota Air Bag Sensor*", Toyota Motor Corporation, Japan, (pp. 89–96).

*Primary Examiner*—Robert Raevis
*Attorney, Agent, or Firm*—Foley & Lardner

[57] ABSTRACT

A self-checking circuit for use with a semi conductor sensor including a semi conductor substrate having a cantilever and piezo resistors formed in said cantilever. The piezo resistors are connected in a bridge circuit having first and second output terminals. A differential amplifier is connected to the first and second output terminals for producing an output signal corresponding to a stress produced in the cantilever. The self-checking circuit comprises a first resistor having a first resistance and a second resistor having a second resistance to provide a small difference between the first and second resistances. A first switching device is provided for connecting the first output terminal to ground through the first resistor in response to a checking signal. A second switching device is provided for connecting the second output terminal to ground through the second resistor in response to a checking signal. The checking signal is applied to the first switching device and at the same time to the second switching device.

4 Claims, 2 Drawing Sheets

5,499,526

SEMICONDUCTOR SENSOR SELF-CHECKING CIRCUIT

This application is a continuation of application Ser. No. 07/959,622, filed Oct. 13, 1992, now abandoned.

BACKGROUND OF THE INVENTION

This invention relates to a self-checking circuit for checking a semiconductor sensor such as a stress sensor, an accelerometer, or the like employing piezo resistors.

In an article entitled "Toyota Air Bag Sensor" by M. Mutoh et al., page 95, in Isata, No. 911270 published 1991, there is described a semiconductor sensor checking circuit used with a semiconductor accelerometer sensor formed in a semiconductor substrate having a cantilever. The semiconductor sensor includes piezo resistors formed in the cantilever connected in a bridge circuit. The bridge circuit operates on a bridge driving voltage for producing an output signal across its two output terminals. The output signal corresponds to a stress produced in the cantilever. In order to cause the bridge circuit to produce a pseudo output signal from the bridge circuit for self-checking, the conventional checking circuit employs a source of small current to supply a small current to one of the output terminals of the bridge circuit. A switching device is provided to connect this current source to the one output terminal of the bridge circuit in response to a checking signal.

With such a conventional checking circuit, however, the current source should be selected to provide a very small current. Assuming now that the piezo resistors have a resistance of 5KΩ, the bridge driving voltage is 3 volts, the maximum change of the piezo-resistors is 0.1% of their original values, which corresponds to the dynamic range of the bridge circuit and the output signal corresponds to 10% of the full range of the bridge circuit, the small current required to produce a pseudo output signal should be as small as 30 nA. For this reason, the conventional checking circuit requires current mirrors arranged in a number of stages. This results in a complex, expensive and space-consuming checking circuit.

SUMMARY OF THE INVENTION

Therefore, it is a main object to provide an improved semiconductor sensor self-checking circuit which is simple, compact and integrated with ease.

There is provided, in accordance with the invention, a self-checking circuit for use with a semiconductor sensor including a semiconductor substrate having a cantilever, and piezo resistors formed in the cantilever and connected in a bridge circuit having first and second output terminals, and a differential amplifier connected to the first and second output terminals for producing an output signal corresponding to a stress produced in the cantilever. The self-checking circuit comprises a first resistor having a first resistance, a second resistor having a second resistance to provide a small difference between the first and second resistances, first switching means responsive to a checking signal for connecting the first output terminal to ground through the first resistor, second switching means responsive to a checking signal for connecting the second output terminal to ground through the second resistor, and means for producing a checking signal to the first switching means and at the same time to the second switching means.

In another aspect of the invention, there is provided, a self-checking circuit for use with a semiconductor sensor including a semiconductor substrate having a cantilever, and piezo resistors formed in the cantilever and connected in a bridge circuit having first and second output terminals, a voltage source for supplying a predetermined driving voltage to drive the bridge circuit, and a differential amplifier connected to the first and second output terminals for producing an output signal corresponding to a stress produced in the cantilever. The self-checking circuit comprises a second voltage source for providing a predetermined control voltage, a first resistor having a first resistance, a second resistor having a second resistance to provide a small difference between the first and second resistances, first switching means responsive to a checking signal for connecting the first output terminal to the second voltage source through the first resistor, second switching means responsive to a checking signal for connecting the second output terminal to the second voltage source through the second resistor, and means for producing a checking signal to the first switching means and at the same time to the second switching means.

BRIEF DESCRIPTION OF THE DRAWINGS

This invention will be described in greater detail by reference to the following description taken in connection with the accompanying drawings, in which like reference numerals refer to the same or corresponding parts, and wherein.

DETAILED DESCRIPTION OF THE INVENTION

Figure 1:
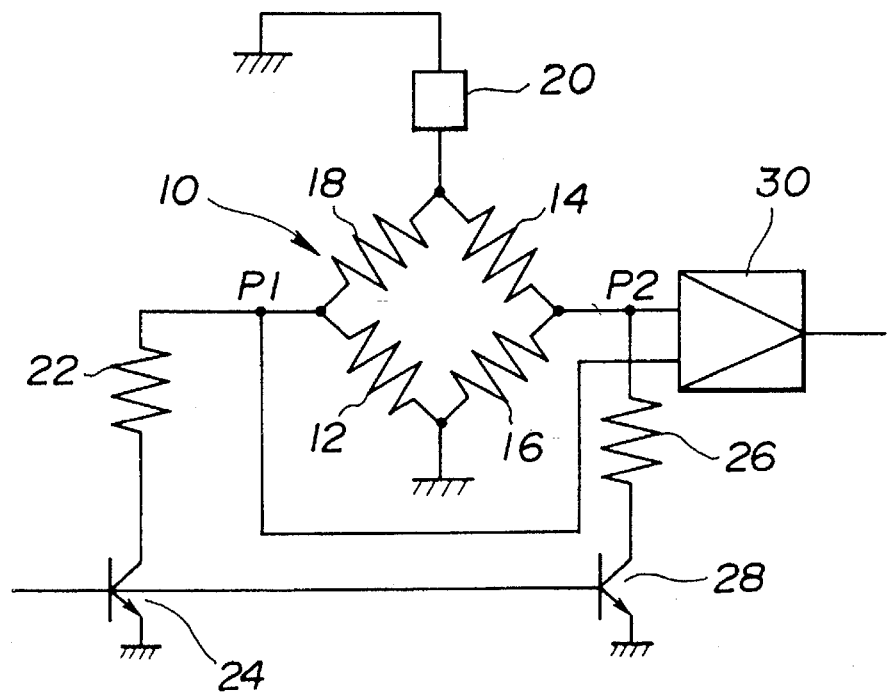
FIG. 1 is a circuit diagram showing one embodiment of a semiconductor sensor self-checking circuit made in accordance with the invention.

With reference to the drawings and in particular to FIG. 1, there is shown a semiconductor sensor self-checking circuit embodying the invention. The circuit includes four piezo resistors 12, 14, 16 and 18 connected in a four-arm bridge circuit 10. A source 20 of voltage connected between the junction of the piezo resistors 14 and 18 and the junction of the piezo resistors 12 and 16. The junction P1 between the piezo resistors 12 and 18 is connected to a first resistor 22 which is in turn connected to the collector of a first NPN switching transistor 24 having an emitter connected to ground. The first transistor 24 is turned on to connect the junction P1 through the resistor 22 to ground in the presence of a checking signal applied to its base. The junction P2 between the piezo resistors 14 and 16 is connected to a second resistor 26 which is in turn connected to the collector of a second NPN switching transistor 28 having an emitter connected to ground. The second transistor 24 is turned on to connect the junction P2 through the resistor 26 to ground in the presence of the checking signal applied to its base. The second resistor 26 has a resistance somewhat different from that of the first resistor 22. A differential amplifier 30 has an input connected to the junction P1 and another input connected to the junction P2. The differential amplifier 30 amplifies the difference between the voltages appearing at the junctions P1 and P2 and it produces an amplified signal 5 at its output.

Figure 2:
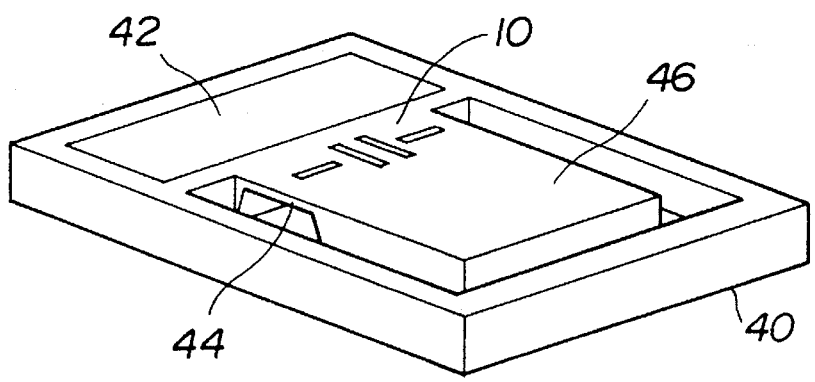
FIG. 2 is a perspective view showing a semiconductor sensor to which the invention is applicable.
Figure 3:
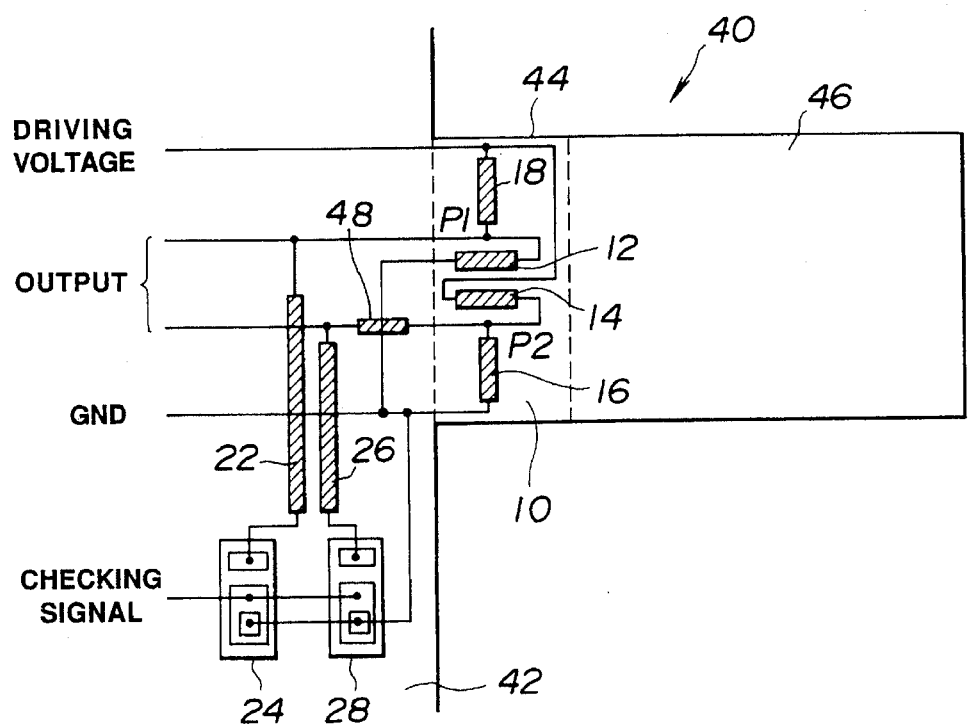
FIG. 3 is a diagram showing the semiconductor sensor self-checking circuit of FIG. 1 formed in a semiconductor substrate.

Referring to FIGS. 2 and 3, the self-checking circuit is formed, together with the semiconductor sensor, on a semiconductor substrate 40 having a fixed support portion 42 from which a thin accelerometer cantilever 44 extends. The accelerometer cantilever 44 has a weight 46 integral therewith. The four piezo resistors 12, 14, 16 and 18 are formed on the accelerometer cantilever 44. The piezo resistors 12 and 14 extend in the direction of length of the accelerometer cantilever 44, whereas the piezo resistors 16 and 18 extend in the direction of width of the accelerometer cantilever 44. That is, one pair of opposite piezo resistors extend in the direction normal to the direction in which the other pair of opposite piezo resistors extend. It is not required to form all of the piezo resistors on the accelerometer cantilever 44. Some of the piezo resistors may be formed on the fixed support portion 42. The first and second resistors 22 and 26 are formed on the fixed support portion 42. The first and second resistors 22 and 26 are taken in the form of diffused resistors having different lengths to provide different resistances. The first and second transistors 24 and 28 are formed on the fixed support portion 42. The numeral 48 designates a jumpering resistor connected between the junction P2 and the second resistor 22.

The operation is as follows:

The checking signal is produced from a control unit when a self-checking operation is required. Normally, the checking signal is interrupted. In the absence of the checking signal, the first and second transistors 24 and 28 remain off. When the piezo-resistor bridge circuit 10 is subject to acceleration with the first and second transistors 24 and 28 being held off, the differential amplifier 30 amplifies an offset corresponding to the strain stress produced in the accelerometer cantilever 44 on which the piezo resistor bridge circuit 10 is formed. The amplified signal indicates the degree of acceleration applied to the semiconductor substrate 40.

When a checking signal is applied to turn the first and second transistors 24 and 28 on, the junction P1 is grounded through the first resistor 22 and at the same time the junction P2 is grounded through the second resistor 26. As a result, the piezo-resistor bridge circuit 10 produces a pseudo output signal which permits self-checking. Assuming now that the voltage applied to the piezo-resistor bridge circuit 10 is 3 volts, the piezo resistors 12, 14, 16 and 18 have 5KΩ, the first resistor 22 has a resistance of 50Ω, and the second resistor 26 has a resistance of 50KΩ+210 Ω, the piezo-resistance bridge circuit 10 will produce an output corresponding to 10% of its dynamic range.

It is, therefore, possible to use normal diffused resistors to permit the piezo-resistor bridge circuit to produce an appropriate output sufficient to perform self-checking and balanced with respect to the dynamic range. This is effective to facilitate sensor chip integration and to provide a compact and inexpensive semiconductor sensor self-checking circuit. Although the bridge driving circuit is taken in the form of a voltage source 20, it is to be understood that the bridge circuit 10 may be operated on a source of electrical current.

Figure 4:
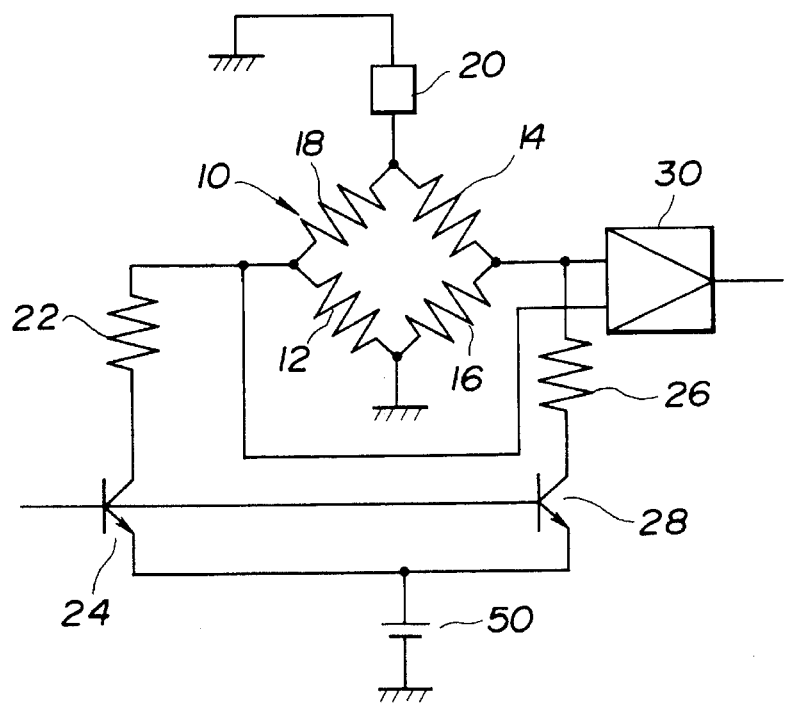
FIG. 4 is a circuit diagram showing an alternative embodiment of the semiconductor sensor self-checking circuit of the invention.

Referring to FIG. 4, there is shown an alternative embodiment of the semiconductor sensor self-checking circuit of the invention. This embodiment is substantially the same as the first embodiment of FIG. 1 except that both of the emitter electrodes of the first and second transistors 24 and 28 are connected to the positive terminal of a voltage source 50 having a negative terminal connected to ground. The voltage source 50 may be set to produce a voltage about equal to one-half of the voltage applied to the bridge circuit 10 from the voltage source 20. This voltage is near the potentials at the output terminals of the piezo-resistor bridge circuit 10. This permits setting of a greater difference between the resistances of the first and second resistors 22 and 26.

For example, to produce an output corresponding to 10% of the dynamic range of the piezo-resistance bridge circuit 10 when the voltage applied to the piezo-resistor bridge circuit 10 is 3 volts and the piezo resistors 12, 14, 16 and 18 have 5KΩ, the first and second resistors 22 and 26 may be selected to have resistances of 50KΩ and 56.3KΩ when the voltage of the voltage source 50 is 1.45 volts. It is, therefore, possible to permit selection of the first and second resistors to have a greater resistance difference. This is effective to increase the range where resistors can be selected for the first and second resistors.

Although the first and second switching devices has been described in connection with the switching transistors 24 and 28, it is to be understood that they are not limited to the bipolar transistors. The first and second switching devices may be taken in the form of MOS transistors.

What is claimed is:

1. A self-checking circuit for use with a semiconductor sensor including a semiconductor substrate having a cantilever, and piezo resistors formed in said cantilever and connected in a bridge circuit having first and second output terminals, a first voltage source for supplying a predetermined driving voltage to drive said bridge circuit, and a differential amplifier connected to said first and second output terminals for producing an output signal corresponding to a stress produced in said cantilever, the self-checking circuit comprising:

a second voltage source;

a first resistor having a first resistance;

a second resistor having a second resistance to provide a difference between the first and second resistances;

first switching means responsive to a checking signal for connecting said first output terminal to said second voltage source through said first resistor;

second switching means responsive to said checking signal for connecting said second output terminal to said second voltage source through said second resistor, said second voltage source being connected to said first and second switching means for providing a predetermined control voltage to said first and second resistors via said first and second switching means, respectively; and means for producing said checking signal to said first switching means and at the same time to said second switching means.

2. The self-checking circuit as claimed in claim 1, wherein said control voltage is about equal to one-half of said driving voltage.

3. The self-checking circuit as claimed in claim 1, wherein said first resistor is a diffused resistor formed in said semiconductor substrate and wherein said second resistor is a diffused resistor formed in said semiconductor substrate.

4. The self-checking circuit as claimed in claim 3, wherein said first switching means includes a first switching transistor formed in said semiconductor substrate and wherein second switching means includes a second switching transistor formed in said semiconductor substrate.

\* \* \* \* \*